(12) United States Patent
Uchida et al.

(10) Patent No.: US 11,199,902 B2
(45) Date of Patent: Dec. 14, 2021

(54) INPUT DEVICE

(71) Applicant: Sony Interactive Entertainment Inc., Tokyo (JP)

(72) Inventors: Nozomu Uchida, Tokyo (JP); Takeshi Igarashi, Kanagawa (JP); Isao Okuyama, Chiba (JP); Kawamura Yoshiaki, Chiba (JP); Katsuhisa Tadano, Kanagawa (JP); Takashi Furukawa, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/815,497

(22) Filed: Mar. 11, 2020

(65) Prior Publication Data

US 2020/0301508 A1 Sep. 24, 2020

(30) Foreign Application Priority Data

Mar. 18, 2019 (JP) .............................. JP2019-050279

(51) Int. Cl.
*G06F 3/01* (2006.01)
*A63F 13/219* (2014.01)
*A63F 13/212* (2014.01)

(52) U.S. Cl.
CPC ............ *G06F 3/014* (2013.01); *A63F 13/212* (2014.09); *A63F 13/219* (2014.09)

(58) Field of Classification Search
CPC ...................................................... G06F 3/014
See application file for complete search history.

(56) References Cited

U.S. PATENT DOCUMENTS

2018/0272232 A1* 9/2018 Campbell ............. G06F 3/0416
2019/0004604 A1* 1/2019 Wang ..................... G06F 3/014

FOREIGN PATENT DOCUMENTS

JP 2011164932 A 8/2011

* cited by examiner

*Primary Examiner* — Peter D McLoone
(74) *Attorney, Agent, or Firm* — Matthew B. Dernier, Esq.

(57) ABSTRACT

An input device includes a tracking target section having an outer surface on which a plurality of light emitting sections are provided; a housing constituting the outer surface of the tracking target section; a first substrate which is a rigid substrate disposed inside the housing; at least one light source mounted on a first surface of the first substrate; and a first light guide member that guides light from the at least one light source to positions of the plurality of light emitting sections on the outer surface of the housing.

9 Claims, 7 Drawing Sheets

INPUT DEVICE

BACKGROUND

The present disclosure relates to an input device having a tracking target section.

There has been a technology of tracking the position or the attitude of an input device by providing a light emitting unit to the input device and by detecting light from the light emitting unit by means of a camera. Japanese Patent Laid-Open No. 2011-164932 discloses an input device for game operations, provided with a spherical light emitting unit.

SUMMARY

Providing a plurality of light emitting sections on an outer surface of an input device has been studied. When a flexible substrate is used as a substrate on which light sources (specifically, light emitting diodes (LEDs)) corresponding to the respective light emitting sections are mounted, a high degree of freedom of the positions of the light emitting sections can be ensured, whereby the stability of detecting the light emitting sections by means of a camera can be easily ensured. However, in terms of the assembling easiness and the cost, using a flexible substrate is not necessarily preferable.

An input device proposed by the present disclosure includes a tracking target section having an outer surface on which a plurality of light emitting sections are provided, a housing constituting the outer surface of the tracking target section, a first substrate which is a rigid substrate disposed inside the housing, at least one light source mounted on a first surface of the first substrate, and a first light guide member that guides light from the at least one light source to positions of the plurality of light emitting sections on the outer surface of the housing. Accordingly, the assembling work of an input device can be facilitated, and the cost can be reduced.

DETAILED DESCRIPTION OF THE PREFERRED EMBODIMENTS

Figure 2:
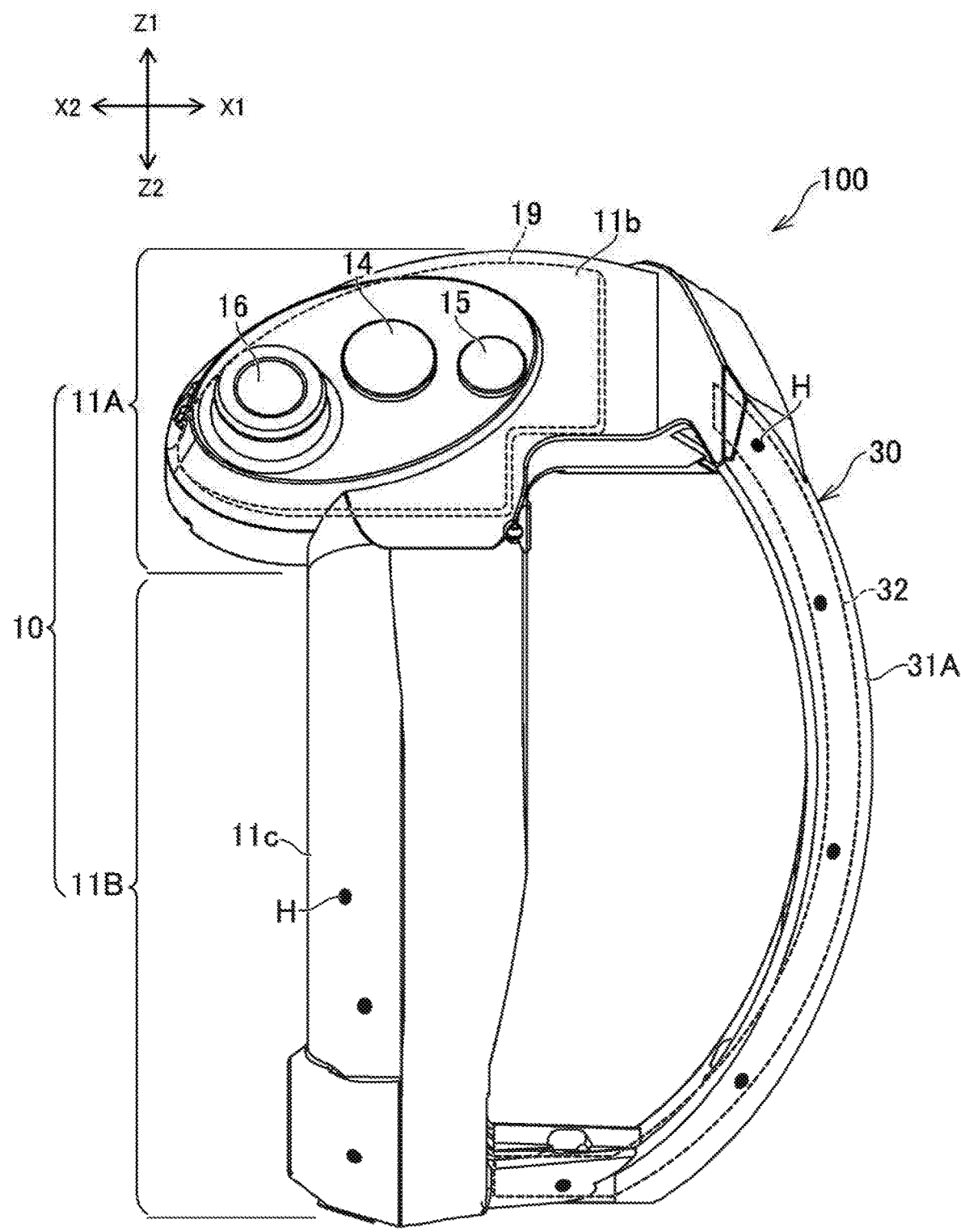
FIG. 2 is a rear view of the input device proposed by an embodiment of the present disclosure.
Figure 3:
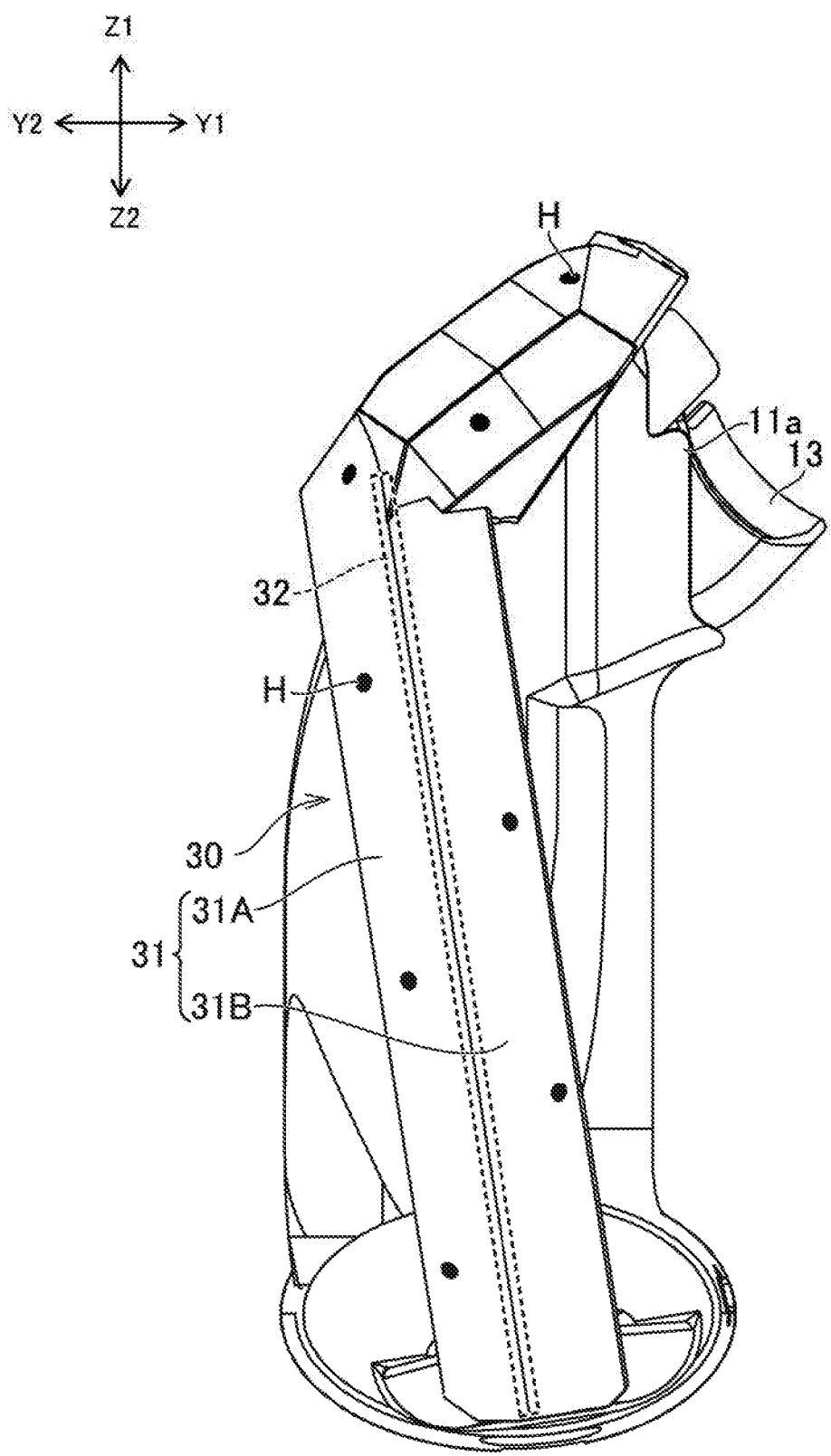
FIG. 3 is a side view of the input device.

Hereinafter, an embodiment of an input device proposed by the present disclosure will be explained. Directions denoted by Z1 and Z2 in FIG. 2 are referred to as an upper direction and a lower direction, respectively, directions denoted by X1 and X2 in FIG. 2 are referred to as a right direction and a left direction, respectively, and directions denoted by Y1 and Y2 in FIG. 3 are referred to as a front direction and a rear direction, respectively, herein. These directions correspond to directions viewed from a user when the user is gripping and using an input device 100, as depicted in FIG. 1.

[Overview of System]

Figure 1:
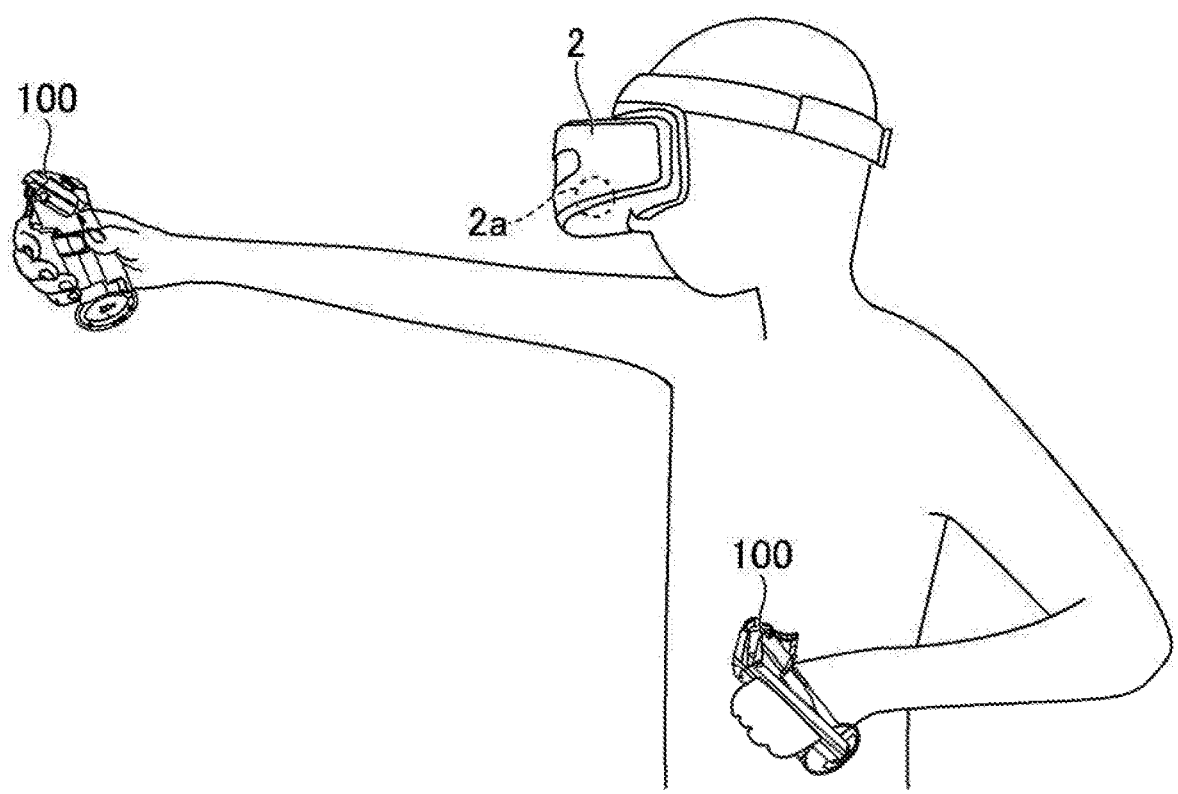
FIG. 1 is an explanatory diagram of a system in which an input device proposed by an embodiment of the present disclosure is used.

As depicted in FIG. 1, the input device 100 is used together with a head mounted display (HMD) 2, for example. The HMD 2 is mounted on a user's head, and the input device 100 is held by the right hand or/and the left hand of the user. The HMD 2 includes a camera 2a which is directed forward. A plurality of light emitting sections H (described later) are provided to the input device 100. The positions of the light emitting sections H are detected through the camera 2a, and the position and the attitude of the input device 100 (i.e., the position and the orientation of a hand of the user) are calculated on the basis of the positions of the light emitting sections. The input device 100 includes a plurality of operation sections (e.g., operation buttons, an operation stick, a touch sensor, etc.) which are operated by fingers of the user, as described later. A video image (e.g., a game image) created on the basis of the position of the input device 100, the attitude of the input device 100, operations performed on the operation sections, and the like, is displayed on a display section of the HMD 2.

The position and the attitude of the input device 100 may be calculated by an information processing device mounted on the HMD 2, or may be calculated by an external information processing device (e.g., a game device or a personal computer separated from the HMD 2). The input device 100 may include a motion sensor (e.g., an acceleration sensor, or a gyro sensor). The information processing device may calculate the position and the attitude of the input device 100 on the basis of not only the positions of the light emitting sections H but also an output from the motion sensor. Further, the video image may be created by the information processing device mounted on the HMD 2, or may be created by an external information processing device. In the case where the external information processing device calculates the position etc. of the input device 100 and creates the video image, image information acquired by the camera 2a is wirelessly or wiredly transmitted to the external information processing device, and created video image information is wirelessly or wiredly transmitted from the external information processing device to the HMD 2. Note that, unlike in the system depicted in FIG. 1, the input device 100 may be used separately from the HMD 2. In this case, a camera for tracking the position and the attitude of the input device 100 may be attached to an external display device (e.g., a television or a personal computer monitor) on which a video image created on the basis of the position and the attitude of the input device 100 is displayed.

[Overall Configuration of Input Device]

The outer shape of the input device 100 for a right hand and the outer shape of the input device 100 for a left hand are symmetrical. The left and right input devices 100 may be different from each other in the number or type of operation members arranged in an operation section 11A. Hereinafter, the right-hand input device 100 will be explained in detail.

As depicted in FIG. 2, a main body 10 of the input device 100 includes a grip 11B, and the operation section 11A on which a plurality of operation members are arranged. The main body 10 has, at the upper portion thereof, the operation section 11A. The grip 11B extends downwardly from the operation section 11A. The operation members arranged on the operation section 11A can be operated by a thumb or an index finger in the state where the grip 11B is grasped. The grip 11B is held by a thenar eminence, a middle finger, a ring finger, and a little finger, for example.

As depicted in FIGS. 2 and 3, for example, operation buttons 13, 14, 15 and an operation stick 16 are arranged as the operation members on the operation section 11A. The operation button 13 is arranged on a front surface 11a of the operation section 11A (see FIG. 3), and is operated by an index finger, for example. The operation buttons 14, 15 and the operation stick 16 are arranged on a rear surface 11b of the operation section 11A (see FIG. 2), and are operated by a thumb, for example. The operation stick 16 is an operation member that can be radially tilted or can slide. The operation members provided on the operation section 11A are not limited to those in the embodiment explained herein. For example, a touch sensor, a trigger button, and a touch sensor-provided button may be provided on the operation section 11A. Further, the number of the operation members provided on the operation section 11A may be one or two, or may be four or greater.

As depicted in FIG. 2, the input device 100 includes a tracking target section 30 on which a plurality of the light emitting sections H are arranged (in FIG. 2, the light emitting sections are indicated by black circles). The tracking target section 30 is formed so as to be separated away from the main body 10. That is, the tracking target section 30 includes a portion extending into an arc shape or an annular shape, and at least the middle portion thereof is separated away from the grip 11B (a space exists between the middle portion and the main body 10). In the embodiment depicted in FIG. 2, the tracking target section 30 is positioned rightward of the main body 10, and is connected to the top portion of the main body 10 and to the bottom portion of the main body 10. The tracking target section 30 extends from the top portion of the main body 10 to the lower side while being curved so as to be expanded outwardly in the left-right direction. The middle portion of the tracking target section 30 is separated rightward away from the grip 11B.

The position and the shape of the tracking target section 30 is not limited to those in the embodiment depicted in FIG. 2, as long as the positions of the light emitting sections H can be stably detected by the camera mounted on the HMD 2. The tracking target section 30 may be positioned leftward of the main body 10, or may be positioned upward, downward, rearward, or forward of the main body 10. The shape of the tracking target section 30 may be a rod-like shape extending straight or may be an annular shape, instead of the curved rod-like shape. In the case where the shape of the tracking target section 30 is an annular shape, the tracking target section 30 may be arranged so as to surround a hand or wrist of the user who is gripping the grip 11B.

The light emitting sections H may be provided on the main body 10. In the example of the input device 100, when the user is griping the grip 11B with the right hand, a left side surface 11c of the main body 10 is not covered with the user's hand. Therefore, as depicted in FIG. 2, a plurality of the light emitting sections H may be provided on the left side surface 11c. Further, a plurality of the light emitting sections H may be provided also on a front surface 11a and a rear surface 11b of the operation section 11A.

[Tracking Target Section]

Hereinafter, the structure of the tracking target section 30 will be explained in detail. Directions recited in the following explanation are used for explaining the relative positional relationship among components (parts, members, and portions) of the tracking target section 30, and are not intended to limit the position of the tracking target section 30 in the input device 100.

Figure 4:
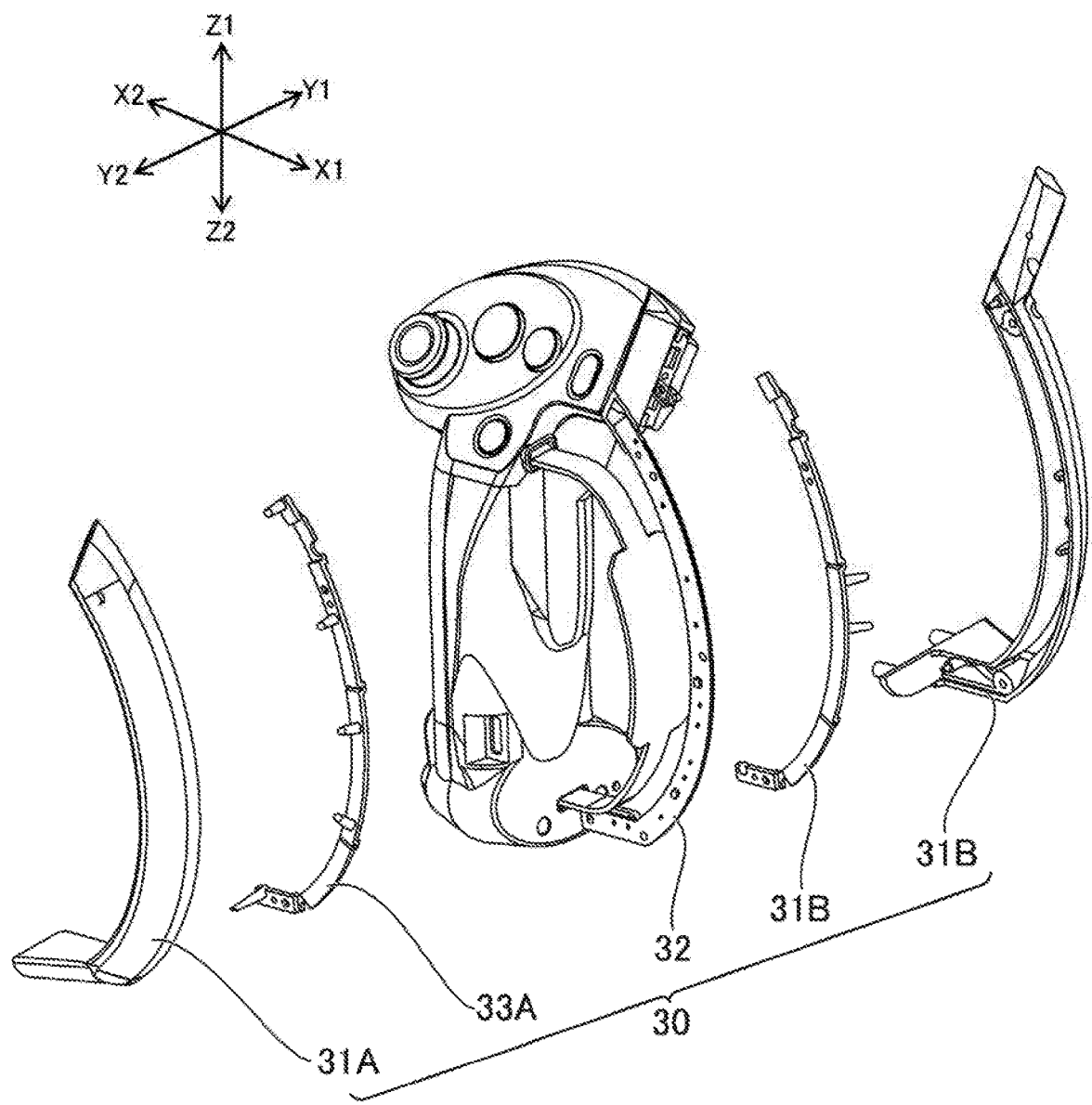
FIG. 4 is an exploded perspective view of a tracking target section included in the input device.

As depicted in FIG. 4, the tracking target section 30 includes a housing 31 (see FIG. 3) constituting the outer shape of the tracking target section 30, and a substrate 32 disposed inside the housing 31. The housing 31 includes a rear housing 31A and a front housing 31B which are assembled in the front-rear direction. The substrate 32 is a rigid substrate which is a paper phenol substrate, a paper epoxy substrate, or a glass epoxy substrate, for example. A plurality of light sources S are mounted on the substrate 32. Specifically, the light sources S are light emitting diodes (LEDs). The plurality of light sources S are arranged in the extension direction of the tracking target section 30. In the example of the input device 100, the plurality of light sources S are mounted on one surface 32a (a surface directed to the rear side in FIG. 5: referred to as a rear surface) of the substrate 32, and the plurality of the light sources S are also mounted on the other surface 32b (a surface directed to the front side in FIG. 5: referred to as a front surface) of the substrate 32.

As depicted in FIG. 2, a substrate 19 on which a switch or a sensor for detecting motions (operations performed by the user) of the operation members including the operation button 13 etc. is mounted is housed in the operation section 11A. The substrate 32 in the tracking target section 30 is a substrate which is separated from the substrate 19 in the operation section 11A. That is, the substrate 32 is formed by a different process from a process by which the substrate 19 is formed. The substrate 32 is curved so as to conform to the outer shape of the tracking target section 30. That is, in a rear view of the input device 100, the substrate 32 extends while being curved in a direction from the upper portion of the main body 10 toward the lower portion of the main body 10.

Light guide members 33A and 33B that guide light from the light sources S to the positions of the light emitting sections H on the outer surface of the housing 31 are disposed inside the housing 31. In the example of the input device 100, the light guide member 33B is disposed on the front side of the substrate 32, and the light guide member 33A is disposed on the rear side of the substrate 32. The light guide member 33A guides light from the light sources S mounted on the rear surface 32a, to the positions of the light emitting sections H, and the light guide member 33B guides light from the light sources S mounted on the front surface 32b, to the positions of the light emitting sections H. End surfaces (light emitting surfaces) 33b of the light guide members 33A and 33B are disposed at the positions of the light emitting sections H. The housing 31 is formed from an opaque material, for example. In this case, only the light emitting sections H of the housing 31 are formed from a light transmissive material. The housing 31 may be formed from a transparent or translucent material.

As explained so far, in the input device 100, the light sources S are mounted on the rigid substrate 32, light therefrom is guided to the positions of the light emitting sections H by the light guide members 33A and 33B. According to this structure, the assembling work of the input device can be facilitated, and the cost of the input device can be reduced, compared to a structure in which a flexible wiring board having light sources mounted thereon is disposed along the inner surface of the housing 31.

Figure 6:
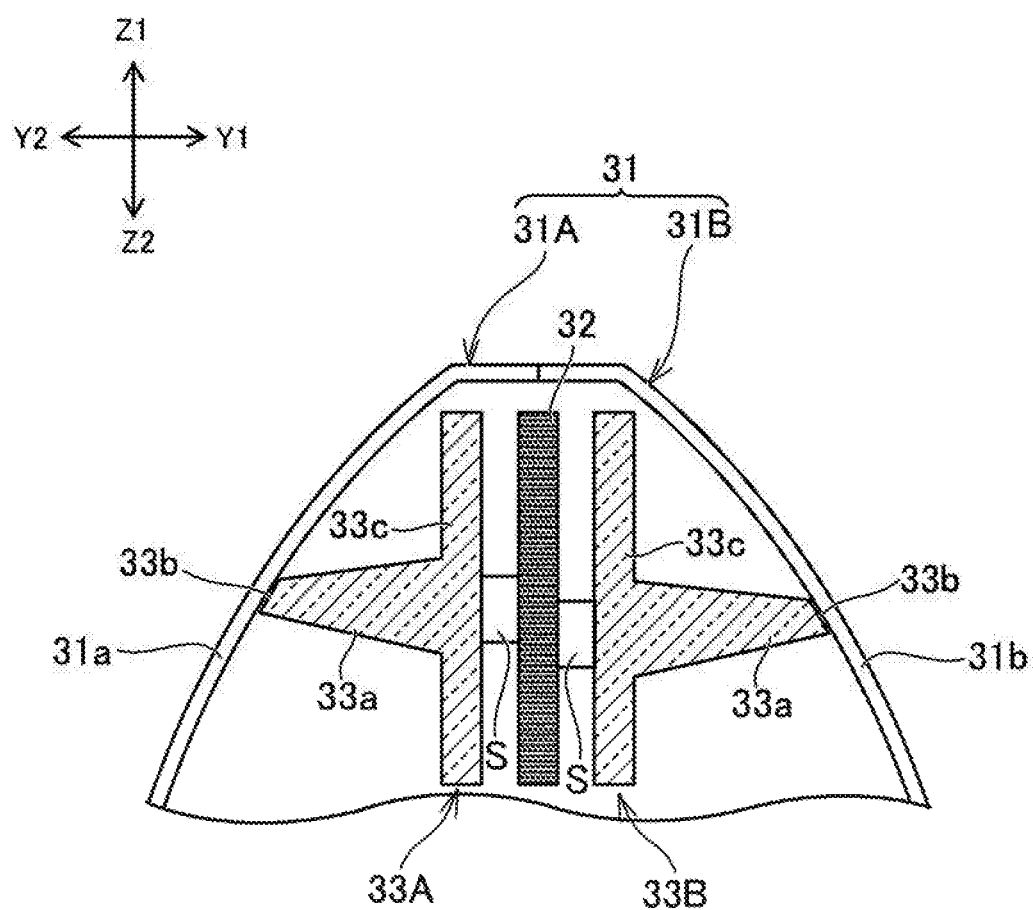
FIG. 6 is a cross-sectional view of the tracking target section taken along line VI-VI in FIG. 5.

As depicted in FIG. 6, the housing 31 has a rear inclined wall 31a, and a front inclined wall 31b that is positioned forward of the rear inclined wall 31a. In the state of facing each other in the front-rear direction, the two inclined walls 31a and 31b extend in the same direction (the extension direction of the tracking target section 30). The two inclined walls 31a and 31b have substantially the same length. In the example of the input device 100, the rear inclined wall 31a is a portion of the rear housing 31A, and the front inclined wall 31b is a portion of the front housing 31B. Unlike in the example of the input device 100, the rear inclined wall 31a and the front inclined wall 31b may be integratedly formed.

The orientation of the rear inclined wall 31a is different from the orientation of the front inclined wall 31b. One of the two inclined walls 31a and 31b is inclined with respect to the other. In the example of the input device 100, the rear inclined wall 31a is directed to the diagonally rear side and to the right side, and the front inclined wall 31b is directed to the diagonally front side and to the right side. The housing 31 is curved in an area between the rear inclined wall 31a and the front inclined wall 31b. The rear inclined wall 31a and the front inclined wall 31b may be smoothly curved. The respective widths Wa and Wb of the inclined walls 31a and 31b (see FIG. 3) may be different from each other. For example, the width of an inclined surface directed to one side of the camera 2a may be wider than the width of an inclined surface directed to the other side. In the system depicted in FIG. 1, the camera 2a exists rearward of the input device 100. Thus, the width Wa of the rear inclined wall 31a may be wider than the width Wb of the front inclined wall 31b, for example. Accordingly, when the input device 100 is photographed by the camera 2a mounted on the HMD 2, the detection accuracy of the light emitting sections H provided on the rear inclined wall 31a can be enhanced. In a system in which the camera is positioned forward of the input device 100, unlike in the system in FIG. 1, the width Wb of the front inclined wall 31b may be wider than the width Wa of the rear inclined wall 31a.

The plurality of light emitting sections H arranged in the extension direction of the tracking target section 30 are provided on each of the rear inclined wall 31a and the front inclined wall 31b. That is, the plurality of light emitting sections H are arranged in two lines on the tracking target section 30.

As depicted in FIG. 6, the substrate 32 is disposed between the rear inclined wall 31a and the front inclined wall 31b. The rear surface 32a of the substrate 32 faces the inner surface of the rear inclined wall 31a, and the front surface 32b of the substrate 32 faces the inner surface of the front inclined wall 31b. The substrate 32 is inclined with respect to both the two inclined walls 31a and 31b.

According to this arrangement regarding the substrate 32, the light emitting sections H on the two inclined walls 31a and 31b can be lit by only one substrate 32 so that the number of components can be reduced. In addition, since the light sources S are mounted on the rear surface 32a and the front surface 32b of the substrate 32, the width of the substrate 32 can be reduced, compared to a structure in which the substrate 32 is disposed so as to be directed to the left-right direction, for example.

Moreover, even in the case where the housing 31 is formed from a transparent or translucent material, the substrate 32 functions as a light shielding member. Thus, the light emitting sections H on the rear inclined wall 31a and the light emitting sections H on the front inclined wall 31b can be prevented from overlapping in an image acquired by the camera of the HMD 2. For example, when an image of the tracking target section 30 is acquired in the state where the camera is positioned rearward of the tracking target section 30, the light emitting sections H on the rear inclined wall 31a are included in the image but the light emitting sections H on the front inclined wall 31b are shielded by the substrate 32, and thus, are not included in the image. As a result, the accuracy of computing the position and the attitude of the input device 100 on the basis of the positions of the light emitting sections H can be enhanced.

Note that, in the embodiment depicted in FIG. 6, the substrate 32 is disposed at the boundary between the rear inclined wall 31a and the front inclined wall 31b. That is, the position, in the front-rear direction, of the substrate 32 substantially matches the position of the boundary between the rear inclined wall 31a and the front inclined wall 31b. However, the position of the substrate 32 may be deviated from the boundary between the rear inclined wall 31a and the front inclined wall 31b.

[Light Guide Members]

Figure 5:
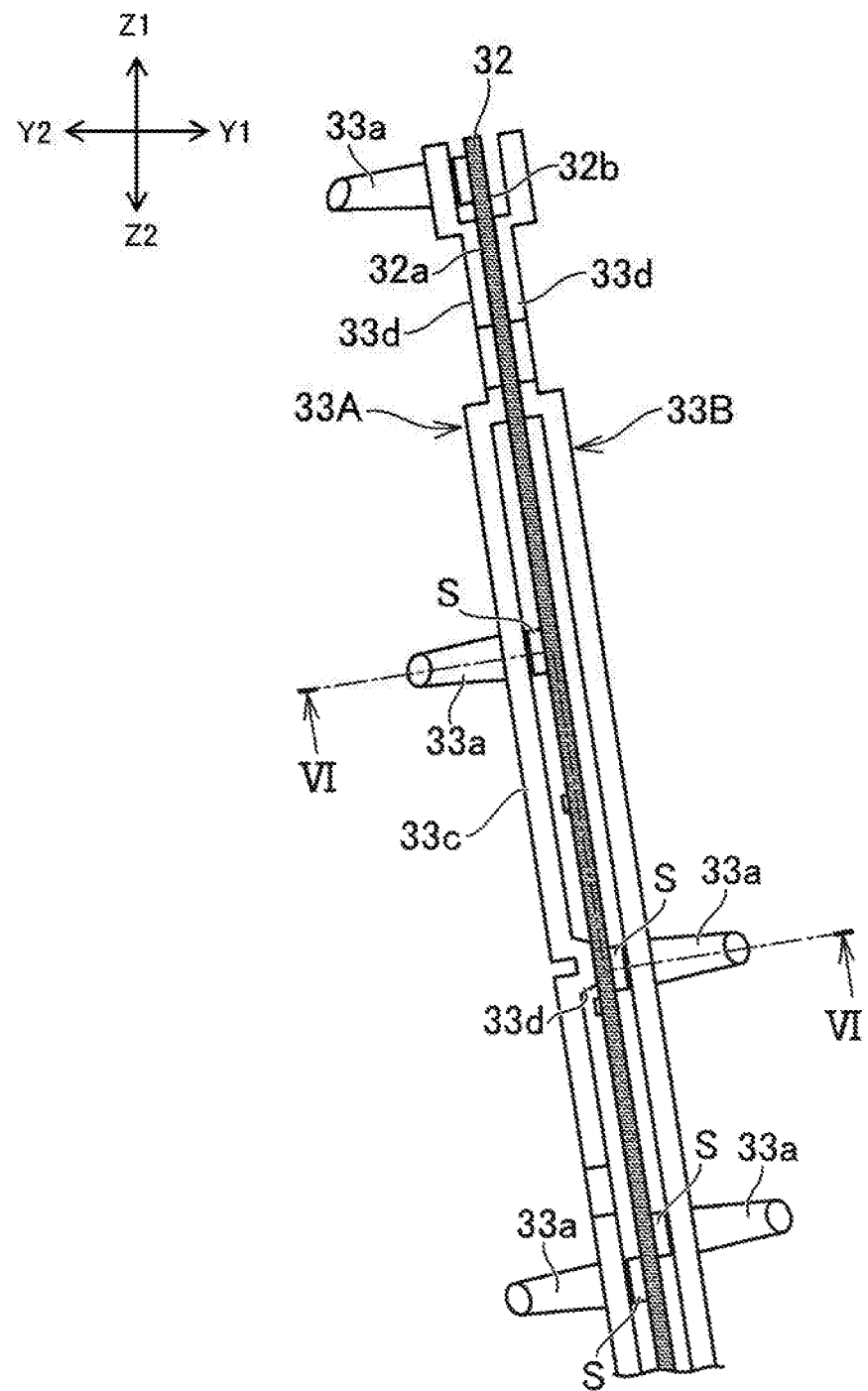
FIG. 5 is a side view of a substrate and a light guide member.

As depicted in FIG. 5, the light guide member 33A has a plurality of light guide sections 33a that guide light from the light sources S to the light emitting sections H. The light guide sections 33a are provided to the plurality of light sources S, respectively. That is, the light sources S correspond to the light guide sections 33a in one to one.

In the example of the input device 100, each of the light guide sections 33a has a columnar shape, and extends straight from the corresponding light source S toward a direction perpendicular to the substrate 32. Therefore, each of the light guide sections 33a guides light from corresponding one of the light sources S to corresponding one of the light emitting sections H. According to this structure, since the light sources S correspond to the light emitting sections H in one to one, the luminance of the light emitting sections H can be easily ensured. In addition, since the light guide sections 33a extend straight, light from the light sources S can be efficiently guided to the light emitting sections H. As depicted in FIG. 6, the rear inclined wall 31a is inclined with respect to the substrate 32. An end surface (light emitting surface) 33b of the light guide section 33a may be inclined with respect to the substrate 32 so as to conform to the rear inclined wall 31a.

As depicted in FIG. 5, the light guide member 33A has a coupling section 33c that couples the plurality of light guide sections 33a. The plurality of light guide sections 33a and the coupling section 33c are integratedly formed. According to this structure, the number of components can be reduced so that the number of steps for assembling the input device 100 can be reduced.

As depicted in FIG. 5, in the input device 100, the coupling section 33c has a plate-like shape disposed along the substrate 32. The coupling section 33c extends from the base of each of the light guide sections 33a to the adjacent light guide section 33a. The light guide member 33A has a size corresponding to the substrate 32. In other words, the light guide member 33A has substantially the same length as the substrate 32. Further, the light guide sections 33a corresponding to all the light sources S mounted on the rear surface 32a of the substrate 32 are formed on one light guide member 33A.

The coupling section 33c is fixed to the substrate 32 or the housing 31 (specifically, the rear housing 31A) with a fixing tool such as a screw. As depicted in FIG. 5, the coupling section 33c includes a support section 33d that is pressed against the substrate 32. Accordingly, the position of the light guide member 33A can be stabilized with respect to the substrate 32.

The light guide member 33B is disposed on the front side of the substrate 32. The front-side light guide member 33B has the same structure as that of the aforementioned rear-side light guide member 33A. That is, the light guide member 33B also has the plurality of light guide sections 33a, the coupling section 33c, and the support section 33d. Since the positions (positions in the up-down direction) of the light guide sections 33a of the front-side light guide member 33B correspond to the positions of the light emitting sections H on the front inclined wall 31b, the positions of the light guide sections 33a of the front-side light guide member 33B may be different from those of the light guide sections 33a of the rear-side light guide member 33A in the up-down direction, as depicted in FIG. 5.

[Modification of Light Guide Members]

The shapes of the light guide members are not limited to those in the embodiment depicted in FIGS. 5 and 6. The light guide members may be formed so as to guide light from one light source S to at least two light emitting sections H. According to this structure, the number of the light sources S can be reduced.

Figure 7:
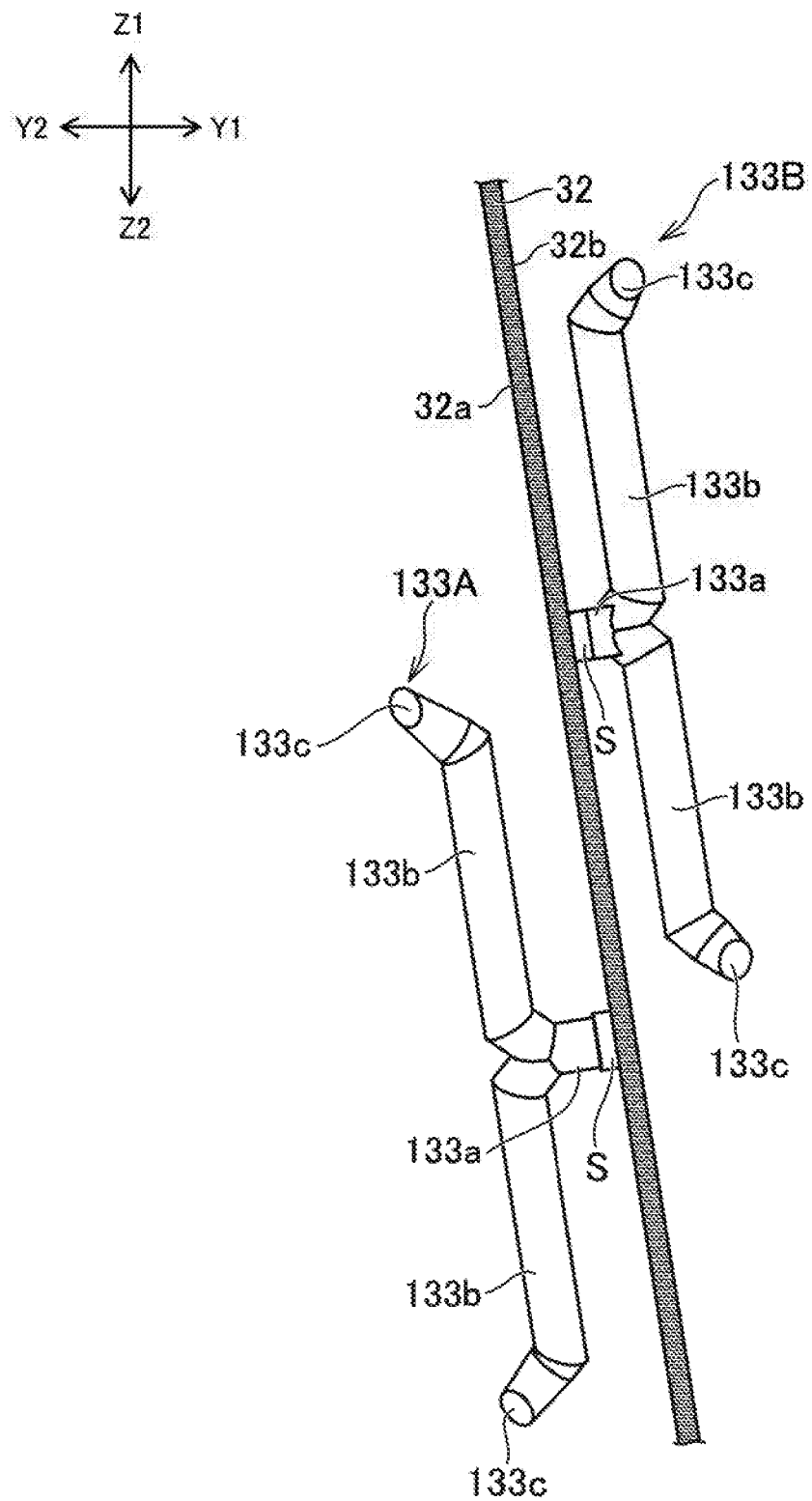
FIG. 7 is a diagram depicting a modification of the light guide member.

FIG. 7 is a side view of a substrate and light guide members having this structure. In FIG. 7, the tracking target section 30 includes a light guide member 133A disposed rearward of the substrate 32, and a light guide member 133B disposed forward of the substrate 32. The light guide members 133A and 133B each have a base 133a that has an incident surface facing one light source S. Also, the light guide members 133A and 133B each have two light guide sections 133b extending in opposite directions from the base 133a. End surfaces (light emitting surfaces) 133c of the light guide sections 133b correspond to the positions of the light emitting sections H. The number of the light guide sections 133b included in each of the light guide members 133A and 133B may be greater than two.

The tracking target section 30 may include a plurality of the light guide members 133A rearward of the substrate 32. In this case, the adjacent light guide members 133A may be coupled with each other. In other words, each of the light guide members may include a plurality of the bases 133a, a plurality of the light guide sections 133b extending from the respective bases 133a, and a coupling section coupling the adjacent bases 133a. Similarly, the tracking target section 30 may include a plurality of the light guide members 133B forward of the substrate 32. In this case, the adjacent light guide members 133B may be coupled with each other.

Other Embodiments

The input device proposed by the present disclosure is not limited to the aforementioned input device 100.

For example, one light source S may be mounted on the rear surface 32a of the substrate 32. Further, the plurality of light emitting sections H may be lit with light from this light source S. Similarly, one light source S may be mounted on the front surface 32b of the substrate 32. Further, the plurality of light emitting sections H may be lit with light from this light source S.

The position of the tracking target section 30 is not limited to that in the example of the input device 100. For example, the tracking target section 30 may be positioned leftward, upward, downward, rearward, or forward of the main body 10. Moreover, the attitude and the shape of the tracking target section 30 are not limited to those in the example of the input device 100. For example, the tracking target section 30 may be disposed so as to extend in the horizontal direction. In the case where the substrate 32 is horizontally disposed, one of the two light guide members 33A and 33B is disposed above the substrate 32, and the other is disposed below the substrate 32. Thus, the above explanation of the tracking target section 30 can be interpreted while a modification is made, as appropriate, according to the attitude of the tracking target section 30.

Moreover, in still another embodiment, the input device 100 may not include the operation members such as the operation buttons 13, 14, 15 or the operation stick 16 which are operated by fingers. Also in this case, by moving the input device 100 while gripping the grip 11B, a user may reflect the user's motion on a video image displayed on the HMD 2. Furthermore, the input device 100 may be mountable to an arm or a wrist. In this case, the input device 100 does not need to include the grip 11B.

The camera for tracking the position and the attitude of the input device 100 is not necessarily provided on the HMD 2. For example, in the case where a video image created on the basis of the position and the attitude of the input device 100 is displayed on an external display device (e.g., a television or a personal computer monitor), as described above, the camera may be attached to the display device.

Further, the camera for tracking the position and the attitude of the input device 100 is not limited to a particular type. The camera may include an image sensor for detecting visible light, or may include an infrared image sensor. In addition, the camera may have installed therein a sensor for outputting only information about a pixel where a change has occurred in the entire angle of view.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2019-050279 filed in the Japan Patent Office on Mar. 18, 2019, the entire content of which is hereby incorporated by reference.

What is claimed is:

1. An input device comprising:
a tracking target section having an outer surface on which a plurality of light emitting sections are provided;
a housing constituting the outer surface of the tracking target section;
a first substrate which is a rigid substrate disposed inside the housing;
at least one light source mounted on a first surface of the first substrate;
a first light guide member that guides light from the at least one light source to positions of the plurality of light emitting sections on the outer surface of the housing;
a light source mounted on a second surface that is a surface opposite to the first surface of the first substrate; and
a second light guide member that is disposed on a side opposite to the first light guide member across the first substrate, and that guides light from the light source on the second surface to positions of the plurality of light emitting sections on the outer surface of the housing.

2. The input device according to claim 1, further comprising:
an operation section which is operated by a user; and
a second substrate disposed in the operation section, wherein
the first substrate is separated from the second substrate.

3. The input device according to claim 2, further comprising:
a main body having the operation section; and
a grip, wherein the tracking target section has an arc or annular shape, and at least a middle portion of the tracking target section is separated away from the main body.

4. The input device according to claim 3, wherein the first substrate is curved so as to conform to an outer shape of the tracking target section.

5. The input device according to claim 1, wherein
the plurality of light emitting sections include a first light emitting section and a second light emitting section,
the at least one light source includes a first light source and a second light source are mounted on the first substrate,
the first light guide member incudes a first light guide section that guides light from the first light source to the first light emitting section, and a second light guide section that guides light from the second light source to the second light emitting section, and
the first light guide section is coupled with the second light guide section.

6. The input device according to claim 5, wherein the first light guide member has a size corresponding to the first substrate.

7. The input device according to claim 1, wherein a plurality of light sources are mounted on each of the first surface and the second surface of the first substrate.

8. The input device according to claim 1, wherein the housing includes a first wall which extends in an extension direction of the tracking target section and on which the plurality of light emitting sections are provided, and a second wall which is formed along the first wall and on which the plurality of light emitting sections are provided,
one of the first wall and the second wall is inclined with respect to the other, and
the first substrate is disposed between the first wall and the second wall.

9. The input device according to claim 8, wherein
the first surface of the first substrate faces an inner surface of the first wall, and
the second surface of the first substrate faces an inner surface of the second wall.

* * * * *